United States Patent [19]

Ravitts

[11] E Re. 29,075

[45] Reissued Dec. 14, 1976

[54] LIQUID AERATOR

[75] Inventor: Richard B. Ravitts, Rockford, Ill.

[73] Assignee: Richards of Rockford, Rockford, Ill.

[22] Filed: Mar. 18, 1974

[21] Appl. No.: 451,990

Related U.S. Patent Documents

Reissue of:

[64] Patent No.: 3,416,729
Issued: Dec. 17, 1968
Appl. No.: 572,018
Filed: Aug. 12, 1966

U.S. Applications:

[63] Continuation of Ser. No. 340,252, March 12, 1973, abandoned.

[52] U.S. Cl. ..... 239/16
[51] Int. Cl.[2] ..... E03B 9/20
[58] Field of Search ..... 239/16; 210/197, 209

[56] References Cited

UNITED STATES PATENTS

| | | | |
|---|---|---|---|
| 2,067,161 | 1/1937 | Durdin, Jr. | 210/197 |
| 2,090,384 | 8/1937 | Durdin, 3rd | 210/197 |
| 2,186,371 | 1/1940 | Durdin | 239/17 X |
| 3,218,042 | 11/1965 | Ciabattari et al. | 239/23 X |

*Primary Examiner*—Stanley H. Tollberg
*Attorney, Agent, or Firm*—Henry L. Brinks

[57] ABSTRACT

A floating liquid aerator includes an axial flow impeller rotated by an electric motor and disposed within a tubular throat to pump water from a pond upwardly through the throat and against a rotatable diffuser which slings the water outwardly for interface contact with the surrounding atmosphere. Being rotatable, the diffuser slings the water into the atmosphere with considerable turbulence thereby exposing more of the water droplets to the atmosphere and resulting in a higher transfer of oxygen to the water. The impeller comprises a series of angularly spaced blades formed with a rectangular cross-section to reduce power losses caused by drag and to increase the volume of water capable of being displaced by the impeller. Each blade is twisted longitudinally with a progressively decreasing attack angle from its root to its tip and, in addition, all of the blades are twisted identically to provide a statically, dynamically and hydrodynamically balanced impeller.

5 Claims, 10 Drawing Figures

INVENTOR
Richard B. Ravitts
John W. Meckenstock
by Wolfe, Hubbard, Leith & Brown
ATTORNEYS

LIQUID AERATOR

Matter enclosed in heavy brackets[ ]appears in the original patent but forms no part of this reissue specification; matter printed in italics indicates the additions made by reissue.

*This application is a continuation of Ser. No. 340,252 filed Mar. 12, 1973, now abandoned which is a reissue application of U.S. Pat. No. 3,416,729.*

BACKGROUND OF THE INVENTION

This invention relates to liquid aerators of the type which are used to prevent water stagnation, to enrich the oxygen content of water to scrub waste from water or to cool water for recirculation. Such aerators usually comprise a multi-bladed axial flow impeller power-rotated by an electric motor and operable to pump water upwardly through a throat. At the upper end of the throat, the water is deflected outwardly for interface contact with the surrounding air prior to falling back into the body of water.

SUMMARY OF THE INVENTION

The present invention aims primarily to provide a new and improved aerator of the above type which, when compared with prior aerators of the same general character, produces better transfer of oxygen to the water and, at the same time, operates with increased pumping efficiency. More specifically, the invention contemplates the provision of a rotatable diffuser located at the upper end of the throat to sling the water outwardly from the throat with considerable turbulence and thereby increase the interfacial exposure of the water to the atmosphere.

Still another aim of the invention is to utilize the rotatable diffuser (1) to counteract the downthrust imposed on the bearings of the motor by the rotating impeller, (2) to reduce the danger of the water freezing and accumulating in the area of the motor, and (3) to create a higher velocity flow at the upper end of the throat to help increase the pumping efficiency.

A further object of the invention is to balance the impeller hydrodynamically to enable the elimination within the throat of bearings which otherwise would be necessary to prevent whipping of the impeller shaft. Such balancing is achieved by twisting each blade uniformly along its length and by twisting all of the blades identically so as to cause every blade to pump an equal volume of water.

The invention also resides in the novel cross-sectional shape of the blades to reduce thrust resulting from a pressure differential across the upper and lower surfaces of the blades and thereby enable most of the power which otherwise would be wasted in creating thrust to be used for effectively displacing water.

Other objects and advantages of the invention will become apparent from the following detailed description taken in connection with the accompanying drawings:

DETAILED DESCRIPTION OF THE PREFERRED EMBODIMENTS

Figure 1:
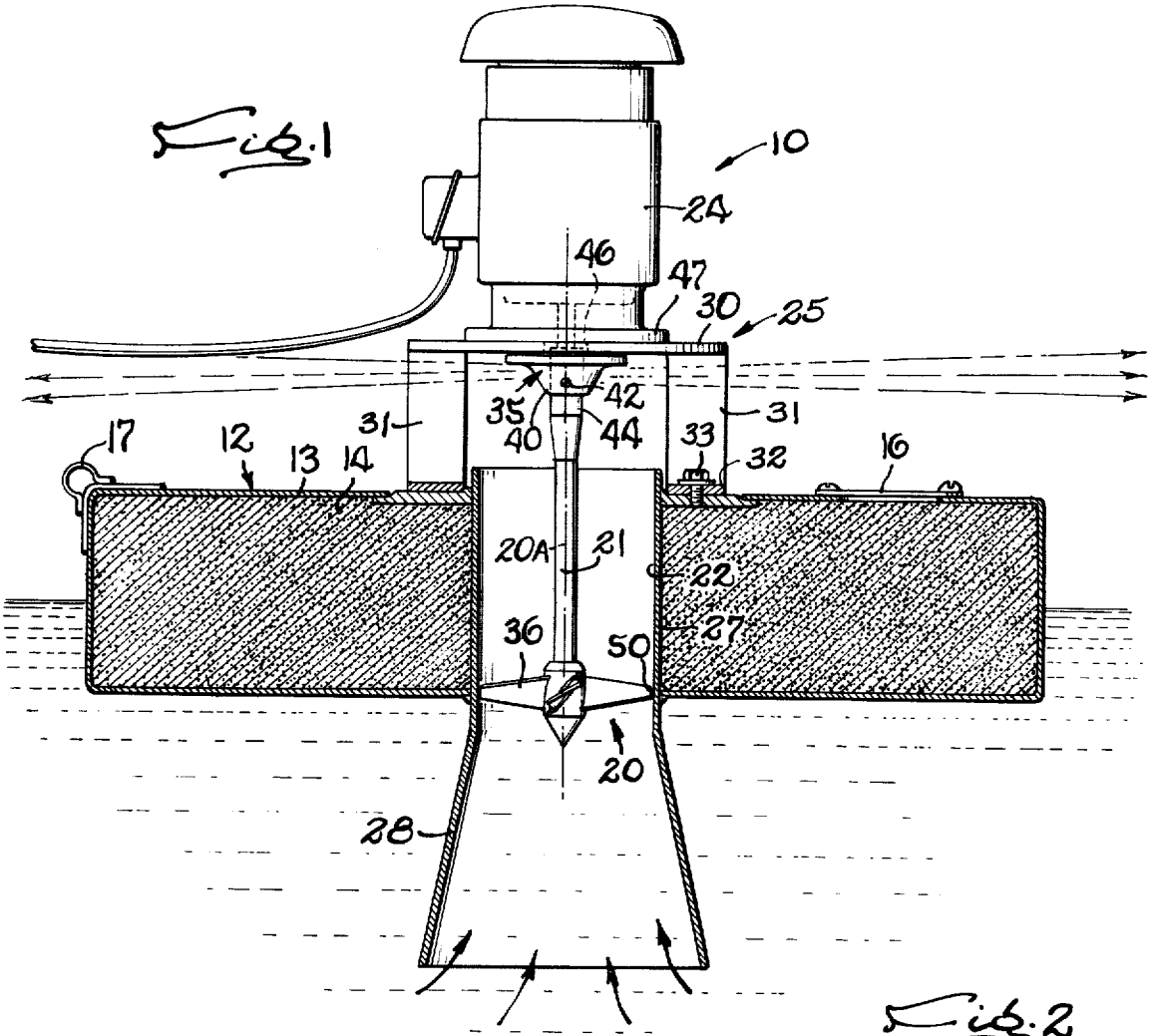
FIG. 1 is a cross sectional view of an aerator embodying the new and improved features of the invention.

In the drawings, the invention is shown for purposes of illustration incorporated in an aerator 10 floating on a body of liquid such as water in a cooling tank, a pond or a waste treatment pool. The aerator is supported at the top surface of the water by a support or float 12 which comprises a sealed outer shell 13, the interior of which is filled with polyurethane foam 14 through a port 15 sealed by a cover 16. To moor the float in a given location, cables (not shown) may be attached to hooks 17 secured to the shell and angularly spaced around the periphery thereof.

Water is pumped upwardly from the body of water for interaction with air by an impeller 20 fixed to a vertical shaft 21 extending in a central passageway 22 in the float. The impeller shaft 21 is connected at its upper end to and for rotation by a motor 24 supported on a motor mount 25 on the shell 13. The water passageway 22 through the float is defined by a cylindrical throat or sleeve 27 disposed centrally in the float and welded to the shell 13 to keep the shell watertight. Extending downwardly from the sleeve is a hollow intake shroud 28 with an enlarged lower end through which the water is pulled from the pond by the impeller.

The water is pumped upwardly through the passageway 22 and moves horizontally beneath a stationary top plate 30 of the motor mount 25 and over the top of the float 12. The top plate is secured to the upper ends of angularly spaced legs 31 which extend downwardly from the plate 30 to an annular mounting flange 32. The latter is bolted to the shell by bolts 33 threaded into a plate on the shell 13.

In accordance with the present invention, increased efficiency of pumping and increased oxygen absorption are achieved with a low cost construction of a floating aerator. Increased oxygen absorption is accomplished in the present invention by increasing water turbulence in the air by means of a rotatable diffuser 35 which is fixed to the shaft 21 and which impinges against the water rising vertically from the passageway 22 to deflect water horizontally across the top of the float. Also, in accordance with the invention, the motor 24 is mounted above the rotatable diffuser in a manner to eliminate the need for a submersible motor and the impeller is hydrodynamically balanced in the passageway so as to eliminate the need for sealed bearings for the impeller shaft. In carrying out this hydrodynamic balancing, the impeller is formed symmetrically about the axis of the shaft and each of the impeller blades 36 is profiled in a precisely identical manner not only to afford a constant volume flow of water across the length of each individual blade but also to cause each blade to pump the same volume of water as every other blade. Increased pumping efficiency is achieved by a novel, thin blade construction which reduces the thrust due to a pressure differential caused by water particles having significant differences in velocity as they flow about the impeller blade. Moreover, the rotatable diffuser coacts with the top plate 30 to produce an air seal to prevent water from moving upwardly along the shaft 21 to the non-submersible motor 24.

Figure 2:
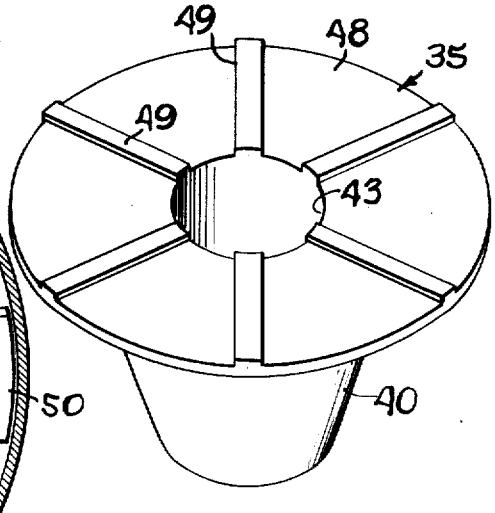
FIG. 2 is a perspective view of the rotatable diffuser.
Figure 3:
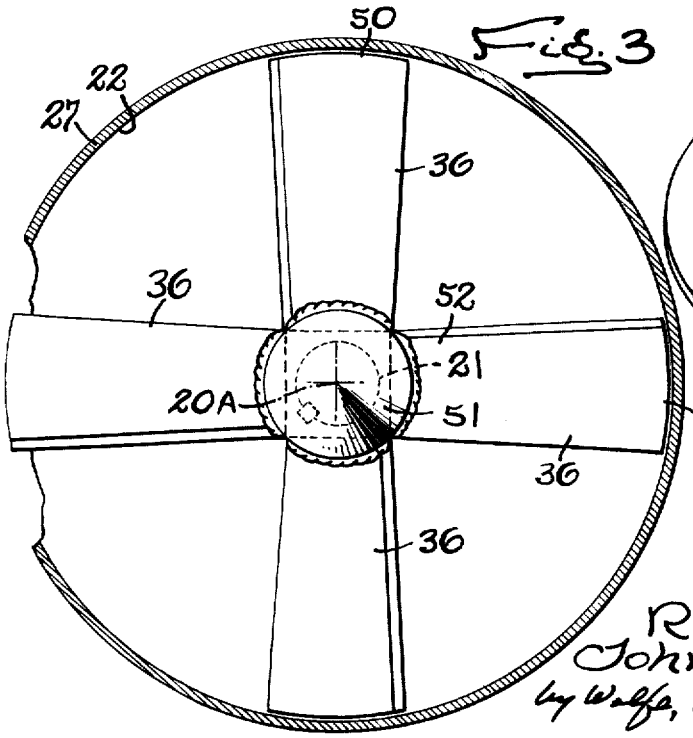
FIG. 3 is a bottom view showing the rotatable impeller.

Because the rotatable diffuser 35 is rotating with the impeller shaft 21, it hits the water particles and slings them outwardly causing molecular turbulence whereby noxious gases in the water are released and replaced by oxygen from the air. The impinging of the diffuser 35 on the water particles may be considered as a shearing action in which the rotating diffuser slices across the vertical rising water to shear through the same and to produce molecular turbulence and agitation increasing the rate of transfer of gases. Also, any solid waste particles impinging on the rotatable diffuser are given a scrubbing action of increased magnitude as compared with impinging against a stationary diffuser. Preferably, the diffuser 35 has a truncated conical surface 40 which is tapered upwardly and outwardly at approximately 45° to the vertical in order to deflect the water outwardly and generally horizontally through the space between legs 31. The rotatable diffuser 35 is secured to rotate with the impeller shaft by set screws 42 which are threaded to extend into a bore 43 (FIG. 2) of the diffuser 35 to engage an upper end 44 of the impeller shaft. This upper end of the impeller shaft is of a larger diameter than the lower end to afford sufficient stock for an interior and upwardly opening socket in which is received the lower end of a motor shaft 45. Suitable set screws (not shown) are threaded through the impeller shaft to engage the motor shaft so that the shafts are fixed coaxially for rotation together by the motor. The motor shaft extends upwardly through an opening 46 in the top plate 30 to the motor 24 which has its base 47 secured to the top plate 30.

To prevent water from moving upwardly through the opening 46 and along the motor shaft 45 to the motor 24, it is preferred that the rotatable diffuser 35 have its upper surface 48 disposed for rotation adjacent the top plate to create a pressure differential to drive air outwardly from between this surface 48 and the top plate 30. To increase the flow of air for sealing the opening 46 against the flow of water, the top surface 48 is formed with a plurality of raised rectangular vanes 49 which are spaced from each other and which extend radially outward from the bore 43 and across the surface 48. The air seal is of considerable importance in that it eliminates the cost of a conventional rotary shaft seal which, moreover, would be subject to attack by abrasive particles, acids or other materials carried by the water. An additional advantage obtained with the rotatable diffuser is that water is slung outwardly and prevented from curling up around the edge of the stationary plate 30 and thereby moving towards the motor as in prior art constructions. Also, the diffuser prevents the water from curling up and freezing around the plate 30.

Figure 4:
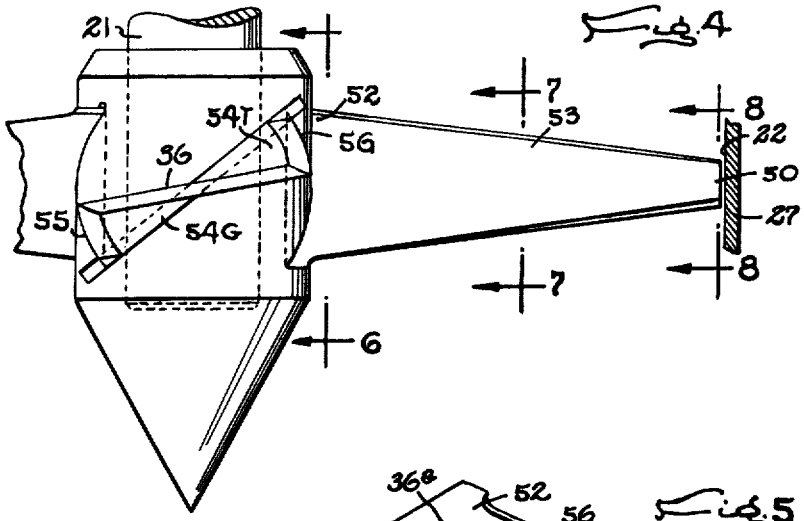
FIG. 4 is an enlarged, fragmentary elevational view of an impeller constructed in accordance with the preferred embodiment of the invention.
Figure 6:
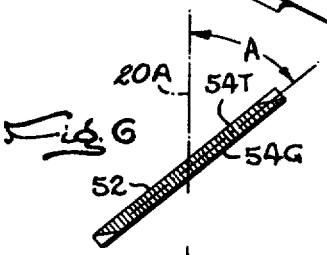
FIGS. 6, 7, and 8 are cross sectional views taken along the respective lines 6—6, 7—7 and 8—8 of FIG. 4 and showing the cross section of an impeller blade and its attack angle.
Figure 7:
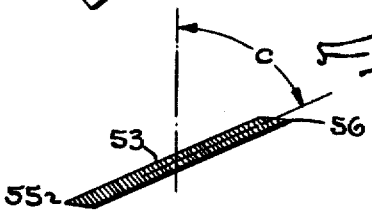
Figure 8:
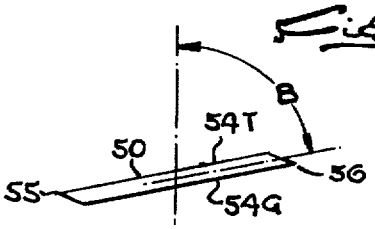

An important aspect of the invention is to eliminate costly sealed bearings for the impeller shaft and this is achieved in the present invention by an impeller 20 which is statically, dynamically and hydrodynamically balanced. The impeller 20 is balanced and in actual practice so that tips 50 of each of the four blades may be spaced within 1/32 of an inch from the sleeve 27 forming the water passageway 22 without the shaft whipping and engaging the blades with the sleeve. Also, the hydrodynamic balancing of the impeller stabilizes the entire float against rocking in the water because the impeller functions in a gyroscopic manner and, moreover, the hydrodynamic balancing lessens the amount of vibration imparted to the motor 24. The impeller is hydrodynamically balanced by having the blades spaced at equal angles about the axis 20A of the impeller and by twisting the blades so that the same volume of water is being moved by the inner end 52 of the blade as by its intermediate portion 53 of the blade and as by the outer tip 50 of the blade. More importantly, every blade is twisted exactly the same so that each pumps the same volume of water to avoid any imbalance in the impeller. Herein, the four identically shaped blades 35 are each fixed to a hub 51 at 90° from the other. Because the outer tip end of the blade rotates at a higher speed than the inner end of the blade and because the preferred form of blade has the same width, the blades are twisted so that the attack angle with the water decreases linearly from the inner end of the blade to the outer end of the blade. In one instance, the inner end of the blade is attached to the hub at angle A (FIG. 4) of 51° and the tip end is at angle B of 80° from the vertical for a blade length of approximately three and one-half inches. As seen in FIGS. 6, 7 and 8, the intermediate portion 53 of the blade has a varying attack angle, angle C in FIG. 7, which is between the angles A and B. More specifically, the angle of attack across the intermediate blade portion changes progressively and linearly from the attack angle A to the attack angle B.

In order to increase the pumping efficiency, each impeller blade 36 is thin and flat with a generally rectangular cross section, as seen in FIGS. 6 through 8, and with its upper and lower surfaces 54T and 54G lying in parallel planes at any given portion of the blade so that the distance water particles travel across the undersurface 54G of the blade approaches the distance water particles travel across the top surface 54T of the blade whereby the velocities of the upper and lower water particles are about the same. A significant difference in velocities of water particles creates a pressure differential on opposite sides of the blades which affords a thrust acting axially of the hub. The thrust tends to move the blades downwardly without moving water and hence the power used in creating the thrust is washed and is not effectively utilized for pumping water. Herein, the thin flat blades reduces the horsepower which is wasted as a result of thrust to a minimum as contrasted to blades which have a cross section which is or closely approaches that of an airfoil. To reduce turbulence of a blade in the water, its leading edge 55 is beveled at 30° along the underside and its trailing edge 56 is beveled at 30° along the top surface. Therefore, the leading edges slice through the water and, as water particles move across the upper and lower blade surfaces, they are guided to meet at the trailing edge of the blade to reduce the bubbling turbulence which would be otherwise encountered if the water particles were not so guided toward one another.

Figure 5:
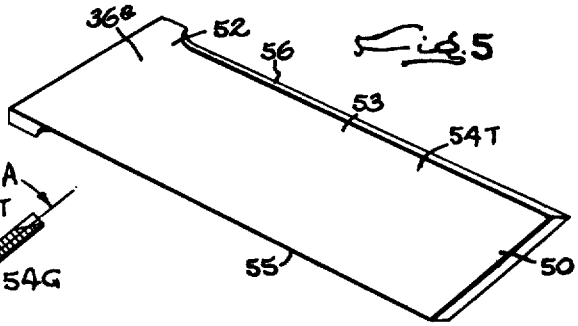
FIG. 5 is a perspective view of a blank for twisting into an impeller blade.

Another and important aspect of invention is to achieve a truly hydrodynamic balanced impeller, as contrasted with prior art impellers, without expensive machining and grinding of complex surfaces. With conventional casting techniques, the impellers must be machined in order to be dynamically balanced and, in so doing, the individual blades of the impeller are often made asymmetrical from a hydraulic balancing standpoint. Herein, the low cost technique involves cutting a series of slots in the hub at the prescribed spacing, 90° apart in this instance, and at the calculated attack angle A and placing the inner ends of the blades in the slots. Then, the inner ends of flat impeller blanks 36a (FIG. 5) are welded to the hub. The impeller blank is in the form of a flat, thin, rectangular plate and the outer end of this flat plate is gripped in a die and turned to a calculated angle of attack, namely the angle B. The flat impeller blank receives a uniform twist between its tip and the hub end to afford a uniform changing attack angle C between its inner end and its tip end. As illustrated in FIGS. 6, 7 and 8, the impeller blade still affords the same thin cross section across its entire length, which, it should be noted, is unchanged from the cross section obtainable from the flat blank 36a. Thus, flat thin impeller blades 36 may be economically and identically formed with a constantly changing attack angle to give the uniform volume flow and hydraulic balance. To avoid a precise balancing of the impeller, metal is removed from the hub. The amount of metal removed is small because of the balance achieved in manufacture.

Figure 9:
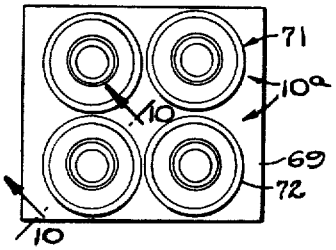
FIG. 9 illustrates a cooling tank having four aerators constructed according to the embodiment of FIG. 10.
Figure 10:
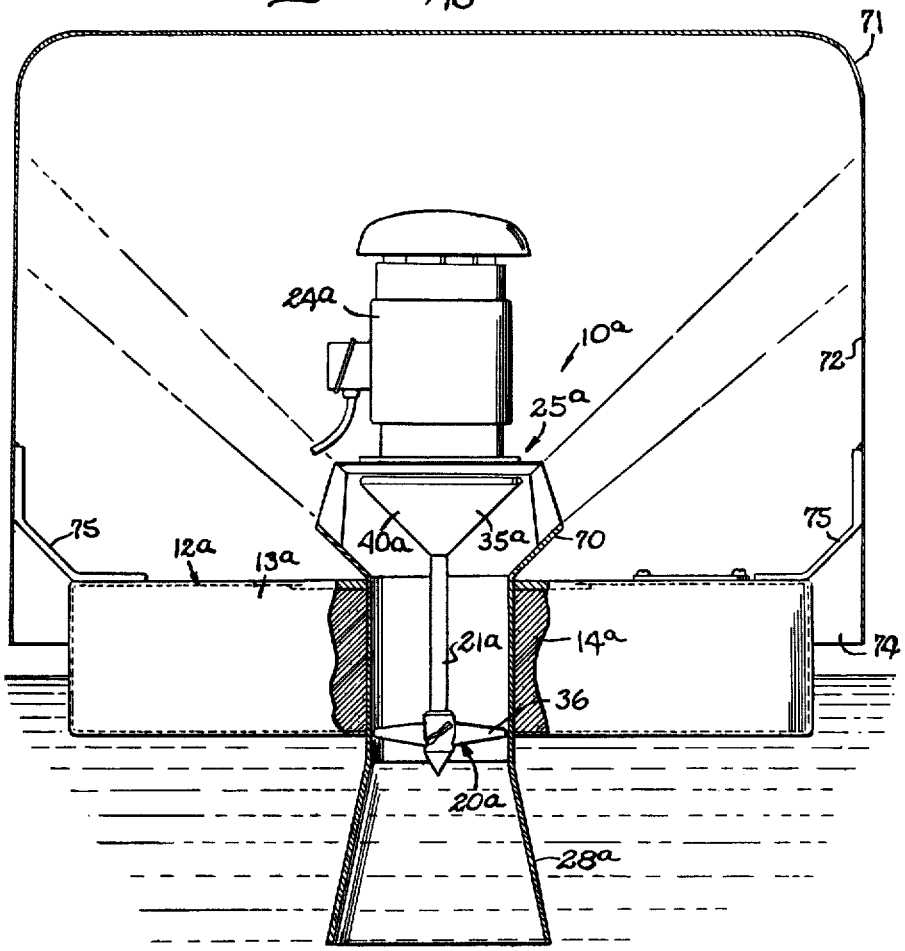
FIG. 10 is a cross sectional view of another embodiment of the invention of particular utility for cooling water.

The length of trajectory of the water in the air from the diffuser 35 is important when the aerator is used for cooling towers or the like in which the transfer of heat from the water to the air is of primary importance. By increasing the length of the path of water through the air, more air interface contact is obtained, and usually over a longer period of time, thereby enabling increased transfer of heat from the water particles. In the embodiment illustrated in FIGS. 9 and 10, aerators 10a are illustrated for use in cooling towers and are of the same general construction as the aerator 10 (FIG. 1) except for slight changes now to be described. A suffix "a" is added to reference characters in FIG. 10 for elements identical or similar to those elements previously described. The rotatable diffuser 35a has a conical surface 40a which is larger than the conical surface 40 of the diffuser 35 and which is configured to throw water particles further upwardly than the rotatable diffuser 35 of FIG. 1. A stationary deflector (FIG. 10) is formed from an upwardly extending, annular baffle 70 to assist in directing the water particles along the path illustrated in FIG. 10.

Where large quantities of water must be cooled in a relatively limited space, as in a cooling tank or tower 69 (FIG. 9), a plurality of spaced aerators 10a may be floated in a body of water in the cooling tower. Each aerator 10 is open at the top to allow air to enter into a housing 71 and to cool the water particles being thrown from the diffusers 25a and 35a to the vertical sidewall 72 of the housing. The water particles stream down the housing wall to exit the housing at an opening 74 between the float 12 and the housing 71. The latter consists of a vertical sheet metal cylinder spaced above and outwardly of the float by brackets 75 which are welded to the float and housing. If space is available, the aerator 10a can be used without a housing so that the water may be thrown further outwardly for increased air contact.

To aid in understanding of the invention a brief description of operation of the aerator is given hereinafter. The electric motor 24 is connected by a suitable cable to a source of electricity and the float 12 is disposed in a body of liquid such as water. With the motor operating, the impeller shaft 21 is driven to turn the impeller 20 and pump water upwardly through the shroud 28 and passageway 22 to the rotatable diffuser 35 fixed to the shaft 21.

The rotatable diffuser 35 impinges against the vertically moving water along its conical surface 40 at an angle to deflect the water while imparting energy thereto and shearing through the water. Such impinging by the rotatable diffuser causes turbulence and interaction with the air to release gases trapped in the water which are exchanged for oxygen from the air.

The motor 24 is non-submersible and is sealed from water moving upwardly along its shaft 45 by an air seal formed by a pressure differential creased by the vanes 49 of the diffuser 35 rotating adjacent the plate 30. Air is driven outwardly from the shaft opening 46 and across the surface 48 of the diffuser to prevent water from moving inwardly between the plate 30 and the top surface 48 of the diffuser to the motor shaft.

The maintenance problems of sealed impeller shaft bearings as well as their initial cost are eliminated in this invention by hydrodynamically balancing the impeller 20. The impeller is hydrodynamically balanced by affording identical and symmetrically spaced blades 36 each of which drives a constant volume of water across its entire surface from its inner end 52 to its outer top end 50. A constant and infinitely changing attack angle is afforded to each blade to achieve this constant volume flow.

Pumping efficiency is increased by a novel blade configuration and impeller construction in which flat thin blades are twisted to afford the continually changing angle which affording a thin cross section reducing axial thrust on the blades due to difference in velocities of water particles moving at a different velocity across the lower surface of the blade than across the upper surface. Also, the edges of the blades are beveled to reduce turbulence. The increased pumping efficiency permits the use of an impeller with a greater pitch in conjunction with a motor of given capacity to produce a greater volume of flow and, when desired, enables the attainment of water velocities necessary to maintain suspension of particles in the water for scrubbing of the particles.

The water impinging on the rotatable diffuser 35 exerts a lifting force on the impeller shaft 21 to offset the downward thrust being imparted by the impeller 20 to the bearings in the motor which rotatably support the impeller shaft 21 and impeller. This lifting force of the water on the diffuser 35 is found to be quite significant in reducing the thrust loads on the motor bearings thereby further reducing maintenance problems and increasing the life of the motor bearings.

From the foregoing it will be seen that hydrodynamically balanced impeller affords a low cost and inexpensive construction and more efficient pumping of a liquid. Also, the rotatable diffuser increases the efficiency of operations such as oxygen transfer, cooling and scrubbing.

[We] *I* claim:

[1. In a liquid aerator, the combination of, a support having an upright tubular throat adapted for immersion in a body of liquid at its lower end and defining an opening at its upper end for the discharge of liquid pumped upwardly through the throat, a power rotated shaft carried by said support and extending axially into said throat, an axial flow impeller disposed within said throat and fixed to and rotatable with the lower end portion of said shaft to pump a column of liquid upwardly through the throat in response to rotation of the shaft, and a diffuser fixed to and rotatable with said shaft above said impeller and adjacent the upper end of said throat and operable to impinge against the upper end of the column of liquid pumped upwardly through the throat and to deflect the liquid outwardly of the throat with considerable turbulence.]

[2. A liquid aerator as defined in claim 1 in which said rotatable diffuser includes a generally conical lower surface concentric with said shaft and tapering downwardly and inwardly, and the lower surface of said diffuser receiving a lifting force from the upwardly moving liquid to offset partially the downward thrust imposed on said shaft as a result of rotation of said impeller.]

[3. A liquid aerator as claimed in claim 1 in which said impeller comprises a central hub attached to said shaft, a series of blades radiating outwardly from and spaced equally around said hub with their roots fixed to the hub and with their tips spaced radially inwardly from said throat, each of said blades being twisted longitudinally with a progressively decreasing attack angle from its root to its tip to develop substantially the same volume of flow at all points along the length of the blade, and each blade being formed with upper and lower surfaces substantially equal width and extending parallel to one another to cause the velocity of liquid flowing across the upper surface to approximate the velocity of the liquid flowing across the lower surface.]

4. In a liquid aerator, the combination of, a support having an upright tubular throat adapted for immersion in a body of liquid at its lower end and defining an opening at its upper end for the discharge of liquid pumped upwardly through the throat, a power rotated shaft carried by said support and extending axially into said throat, an axial flow impeller disposed within said throat and fixed to and rotatable with the lower end portion of said shaft to pump a column of liquid upwardly through the throat in response to rotation of the shaft, said impeller comprising a central hub attached to said shaft, a series of blades radiating outwardly from and spaced equally around said hub with their roots fixed to the hub and with their tips spaced radially inwardly from said throat, each of said blades being twisted longitudinally with a progressively decreasing attack angle from its root to its tip to develop substantially the same volume of flow at all points along the length of the blade, and each blade being formed with upper and lower surfaces of substantially equal width and extending parallel to one another to cause the velocity of liquid flowing across the upper surface to approximate the velocity of the liquid flowing across the lower surface.

5. An aerator as defined in claim 4 in which each of said blades is [of rectangular cross-section and is] formed from a metal plate whose upper and lower surfaces are initially flat and lie in two parallel planes.

6. An aerator as defined in claim 4 in which said hub is formed with slots spaced equally around its outer surface and located at predetermined angles to the horizontal, the roots of said blades being located in said slots and being welded to said hub.

7. In a method of forming an axial flow impeller having an upright central hub and a series of blades radiating outwardly from and spaced equally around said hub, said method comprising the steps of rigidly attaching to the hub at equally spaced locations and at equal angles to the horizontal a series of metal plates having initially flat and parallel upper and lower surfaces, and gripping the outer end portion of each plate and twisting the latter longitudinally and uniformly about its center line to decrease linearly from the inner end of the plate to the outer end of the plate the angle of the plate to the horizontal while still maintaining the upper and lower surfaces of the plate parallel to one another.

8. A method as defined in claim 7 in which the step of attaching said blades to said hub includes placing the inner ends of the blades into slots spaced equally around the hub at predetermined angles to the horizontal, and thereafter welding the inner ends of the blades to the hub while said inner ends are held in said slots.

* * * * *

UNITED STATES PATENT OFFICE

CERTIFICATE OF CORRECTION

Patent No. RE. 29,075 Dated December 14, 1976

Inventor(s) Richard B. Ravitts

It is certified that error appears in the above-identified patent and that said Letters Patent are hereby corrected as shown below:

Column 4, line 51, "washed" should read -- wasted --.

Column 5, line 11, delete "tip".

Column 5, line 24, "avoid" should read -- achieve --.

Column 7, line 19, "claimed" should read -- defined --.

Column 7, line 29, after "surfaces, insert -- of --.

Column 8, line 16, delete "of rectangular cross-section and is".

Signed and Sealed this

*twenty-third* Day of *August 1977*

[SEAL]

*Attest:*

RUTH C. MASON
*Attesting Officer*

C. MARSHALL DANN
*Commissioner of Patents and Trademarks*